United States Patent
Thomas

(10) Patent No.: US 8,479,347 B1
(45) Date of Patent: Jul. 9, 2013

(54) APPARATUS FOR CLEANING AN ELEVATED SURVEILLANCE CAMERA

(76) Inventor: Marvin D. Thomas, Fayetteville, NC (US)

(*) Notice: Subject to any disclaimer, the term of this patent is extended or adjusted under 35 U.S.C. 154(b) by 228 days.

(21) Appl. No.: 13/066,563

(22) Filed: Apr. 18, 2011

(51) Int. Cl.
*B08B 1/00* (2006.01)

(52) U.S. Cl.
USPC ........... 15/210.1; 15/104.94; 15/118; 15/97.1

(58) Field of Classification Search
USPC .......... 15/21.1, 22.1, 88.1, 97.1, 103, 104.94, 15/118, 160, 210.1, 220.1, 232, 246
See application file for complete search history.

(56) References Cited

U.S. PATENT DOCUMENTS

| | | | | |
|---|---|---|---|---|
| 1,525,092 A | * | 2/1925 | Scherner | 15/21.1 |
| 7,392,564 B1 | * | 7/2008 | Ferris | 15/210.1 |

OTHER PUBLICATIONS

"RAID System: Big Success through Small Business Partnering" Raytheon; Prior to Apr. 18, 2011; pp. 1-2.
Gourley, Scott R.; "Soldier Armed: RAID Tower Sensor Helps Force Protection Equation"; Feb. 2009; Army; pp. 61-62.

* cited by examiner

*Primary Examiner* — Mark Spisich
(74) *Attorney, Agent, or Firm* — Schwartz Law Firm, P.C.

(57) ABSTRACT

An apparatus for cleaning an elevated tower-mounted surveillance camera in situ at an operational altitude on a camera tower. The apparatus incorporates a plurality of elongated elevating rods adapted for being assembled together end-to-end to extend from a ground elevation substantially to the tower-mounted camera. A head support assembly is attached to one of the plurality of elevating rods, and is adapted for being located proximate the tower-mounted camera. At least one cleaning head is attached to the head support assembly, and is adapted for engaging and cleaning a lens of the tower-mounted camera. A tower-traveling guide is attached to one of the plurality of elevating rods, and is adapted for engaging and moving along the camera tower as the elevating rods are assembled and extended from the ground elevation towards the tower-mounted camera.

15 Claims, 6 Drawing Sheets

APPARATUS FOR CLEANING AN ELEVATED SURVEILLANCE CAMERA

TECHNICAL FIELD AND BACKGROUND OF THE INVENTION

This disclosure relates broadly and generally to an apparatus and method for cleaning an elevated camera, and in one exemplary application, to an apparatus and method for cleaning a military surveillance camera in situ at an operational altitude high above a ground elevation. The camera may be mounted atop a Rapid Aerostat Initial Deployment (RAID) tower designed for persistent long-range surveillance and rangefinding. Such cameras support a variety of missions ranging from force protection to force projection to border surveillance for domestic homeland security.

SUMMARY OF EXEMPLARY EMBODIMENTS

Various exemplary embodiments of the present invention are described below. Use of the term "exemplary" means illustrative or by way of example only, and any reference herein to "the invention" is not intended to restrict or limit the invention to exact features or steps of any one or more of the exemplary embodiments disclosed in the present specification. References to "exemplary embodiment," "one embodiment," "an embodiment," "various embodiments," and the like, may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

It is also noted that terms like "preferably", "commonly", and "typically" are not utilized herein to limit the scope of the claimed invention or to imply that certain features are critical, essential, or even important to the structure or function of the claimed invention. Rather, these terms are merely intended to highlight alternative or additional features that may or may not be utilized in a particular embodiment of the present invention.

According to one exemplary embodiment, the present disclosure comprises an apparatus for cleaning an elevated tower-mounted surveillance camera in situ at an operational altitude on a camera tower. The apparatus incorporates a plurality of elongated elevating rods adapted for being assembled together end-to-end to extend from a ground elevation substantially to the tower-mounted camera. A head support assembly is attached to one of the plurality of elevating rods, and is adapted for being located proximate the tower-mounted camera. At least one cleaning head is attached to the head support assembly, and is adapted for engaging and cleaning a lens of the tower-mounted camera. A tower-traveling guide is attached to one of the plurality of elevating rods, and is adapted for engaging and moving along the camera tower as the elevating rods are assembled and extended from the ground elevation towards the tower-mounted camera.

According to another exemplary embodiment, at least one stabilizing rope is attached to one of the plurality of elevating rods, and is adapted for being held by a user at the ground elevation to stabilize the apparatus when deployed.

According to another exemplary embodiment, the head support assembly comprises an articulated arm, and the cleaning head is attached to the articulated arm.

According to another exemplary embodiment, the head support assembly comprises an elongated crossbar, and first and second arms attached at respective opposite ends of the crossbar.

According to another exemplary embodiment, first and second cleaning heads are attached to respective first and second arms of the head support assembly.

According to another exemplary embodiment, first and second articulated joints interconnect the crossbar and the first and second arms of the head support assembly.

According to another exemplary embodiment, the cleaning head comprises a removable cleaning pad impregnated with a cleaning solution.

According to another exemplary embodiment, means are provided for releasably locking together a male end of one elevating rod and a female end of an adjacent elevating rod. The locking means may comprise, for example, a spring-loaded detent and matching locking hole, complementary screw threads, clamping or friction-engaging elements, or the like.

According to another exemplary embodiment, the tower-traveling guide comprises a rotatable wheel.

In yet another exemplary embodiment, the disclosure comprises an apparatus for cleaning an elevated tower-mounted surveillance camera in situ at an operational altitude on a camera tower. The apparatus incorporates a plurality of elongated elevating rods adapted for being assembled together end-to-end to extend from a ground elevation substantially to the tower-mounted camera. A head support assembly is attached to one of the plurality of elevating rods, and comprises an elongated crossbar and first and second articulated arms. The articulated arms are attached at respective opposite ends of the crossbar, and are adapted for being located proximate the tower-mounted camera. First and second cleaning heads are attached to respective first and second articulated arms of the head support assembly, and are adapted for engaging and cleaning a lens of the tower-mounted camera. A tower-traveling guide is attached to one of the plurality of elevating rods, and is adapted for engaging and moving along the camera tower as the elevating rods are assembled and extended from the ground elevation towards the tower-mounted camera.

According to another exemplary embodiment, the first cleaning head comprises a removable cleaning pad impregnated with a cleaning solution, and the second cleaning head comprises a removable substantially dry cleaning pad.

In yet another exemplary embodiment, the present disclosure comprises a method for cleaning an elevated tower-mounted surveillance camera in situ at an operational altitude on a camera tower. The method includes elevating a cleaning head from a ground elevation to a point proximate the tower-mounted camera. The cleaning head is held stationary against a lens of the tower-mounted camera. With the cleaning head held against and engaging the lens, the tower-mounted camera is then moved (e.g., rotated, side-to-side, and/or vertically) to clean the lens.

According to another exemplary embodiment, the method includes impregnating the cleaning head with a cleaning solution.

According to another exemplary embodiment, the step of elevating the cleaning head comprises assembling a plurality of elongated elevating rods end-to-end to height greater than 50 feet.

According to another exemplary embodiment, the step of elevating the cleaning head further comprises guiding the elevating rods along a length of the camera tower during assembly from the ground elevation towards the tower-mounted camera.

According to another exemplary embodiment, the step of holding the cleaning head stationary against the lens comprises using at least one stabilizing rope held by a user located at the ground elevation.

BRIEF DESCRIPTION OF THE DRAWINGS

The present invention will hereinafter be described in conjunction with the following drawing figures, wherein like numerals denote like elements, and wherein.

DESCRIPTION OF EXEMPLARY
EMBODIMENTS AND BEST MODE

The present invention is described more fully hereinafter with reference to the accompanying drawings, in which one or more exemplary embodiments of the invention are shown. Like numbers used herein refer to like elements throughout. This invention may, however, be embodied in many different forms and should not be construed as limited to the embodiments set forth herein; rather, these embodiments are provided so that this disclosure will be operative, enabling, and complete. Accordingly, the particular arrangements disclosed are meant to be illustrative only and not limiting as to the scope of the invention, which is to be given the full breadth of the appended claims and any and all equivalents thereof. Moreover, many embodiments, such as adaptations, variations, modifications, and equivalent arrangements, will be implicitly disclosed by the embodiments described herein and fall within the scope of the present invention.

Although specific terms are employed herein, they are used in a generic and descriptive sense only and not for purposes of limitation. Unless otherwise expressly defined herein, such terms are intended to be given their broad ordinary and customary meaning not inconsistent with that applicable in the relevant industry and without restriction to any specific embodiment hereinafter described. As used herein, the article "a" is intended to include one or more items. Where only one item is intended, the term "one", "single", or similar language is used. When used herein to join a list of items, the term "or" denotes at least one of the items, but does not exclude a plurality of items of the list.

For exemplary methods or processes of the invention, the sequence and/or arrangement of steps described herein are illustrative and not restrictive. Accordingly, it should be understood that, although steps of various processes or methods may be shown and described as being in a sequence or temporal arrangement, the steps of any such processes or methods are not limited to being carried out in any particular sequence or arrangement, absent an indication otherwise. Indeed, the steps in such processes or methods generally may be carried out in various different sequences and arrangements while still falling within the scope of the present invention.

Additionally, any references to advantages, benefits, unexpected results, or operability of the present invention are not intended as an affirmation that the invention has been previously reduced to practice or that any testing has been performed. Likewise, unless stated otherwise, use of verbs in the past tense (present perfect or preterit) is not intended to indicate or imply that the invention has been previously reduced to practice or that any testing has been performed.

Figure 1:
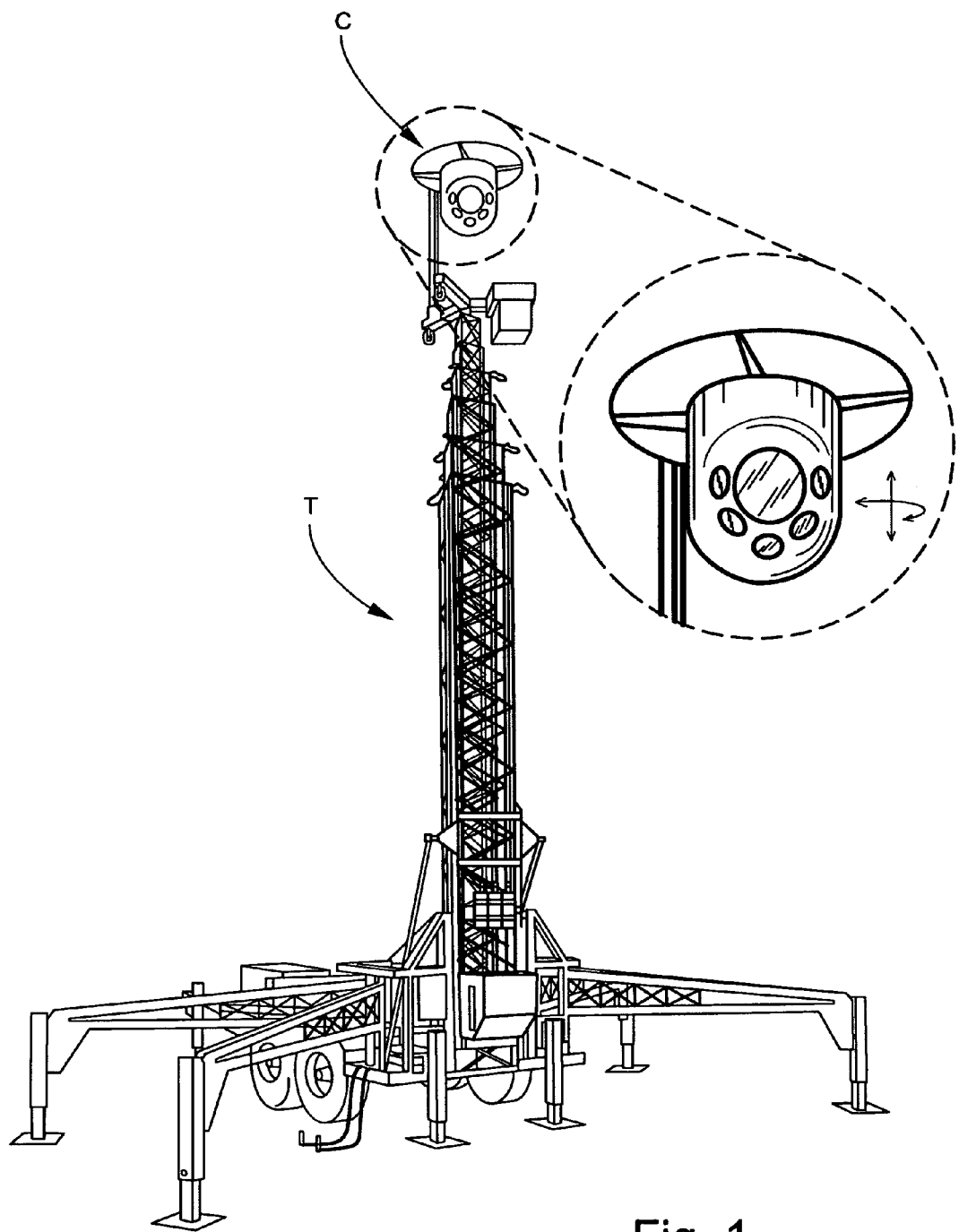
FIG. 1 illustrates a prior art RAID tower and military surveillance camera, and showing the RAID tower in a retracted condition.

Referring now specifically to the drawings, FIG. 1 illustrates a prior art military RAID tower "T" including a tower-mounted infrared long-range surveillance camera "C", such as the Star SAFIRE® III manufactured by FLIR Systems, Inc. of Wilsonville, Oreg. The exemplary RAID tower "T" has telescoping sections designed to extend from a substantially nested (or retracted) condition, shown in FIG. 1, to a fully extended or deployed condition, shown in FIG. 2. In the extended condition, the RAID tower "T" locates the surveillance camera "C" at an operational altitude of up to 107 feet for maximum surveillance and rangefinding capabilities. The tower "T" is mounted on a mobile trailer, and may be stabilized at a ground elevation by outriggers and anchored guy-wires. An electric motor and winch assembly (or other suitable drive means) may be employed to electro-mechanically extend and retract the tower "T".

Figure 2:
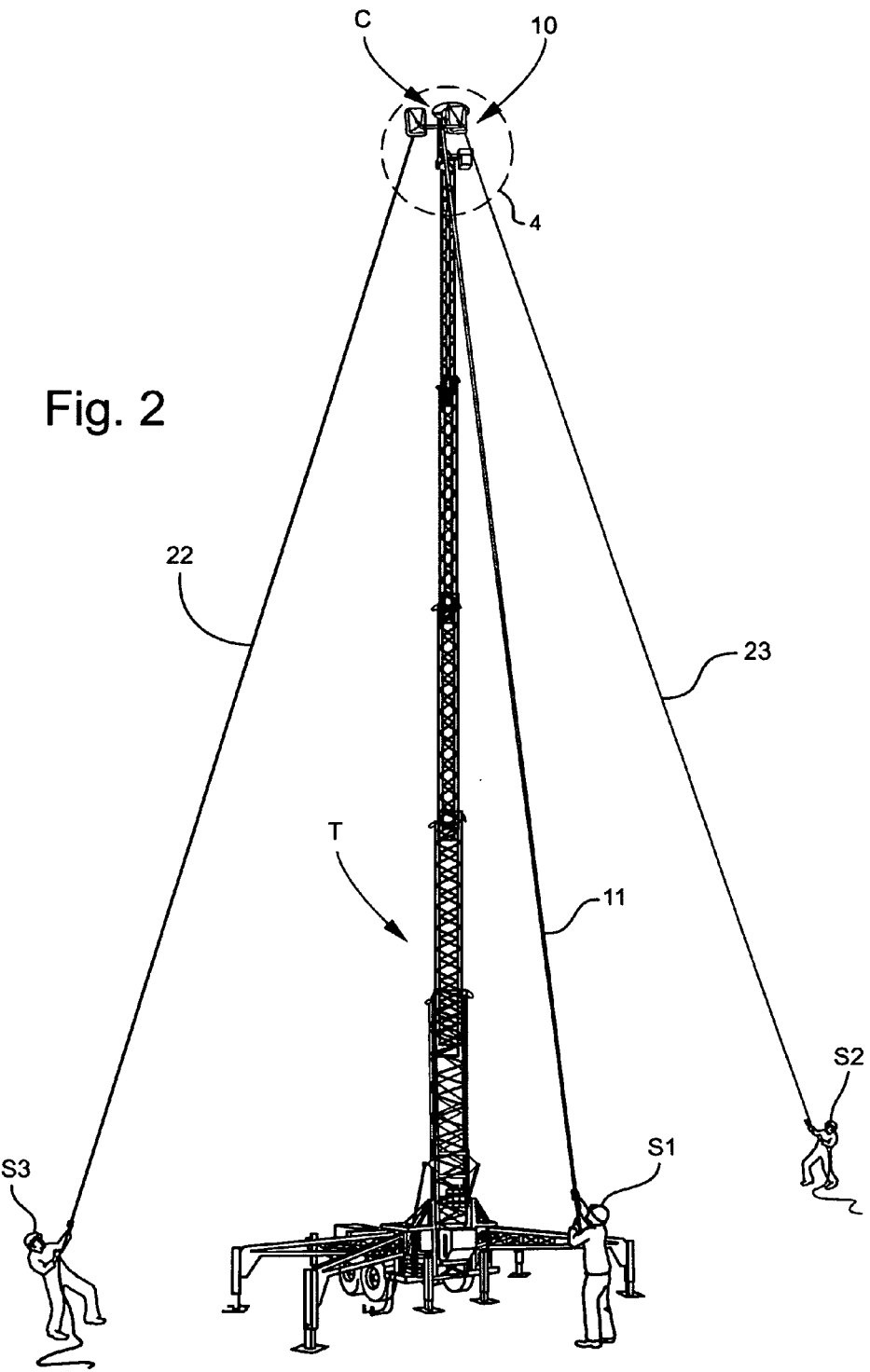
FIG. 2 is a view demonstrating use of the exemplary cleaning apparatus on a surveillance camera located at an operational altitude atop the RAID tower in the extended condition.
Figure 3:
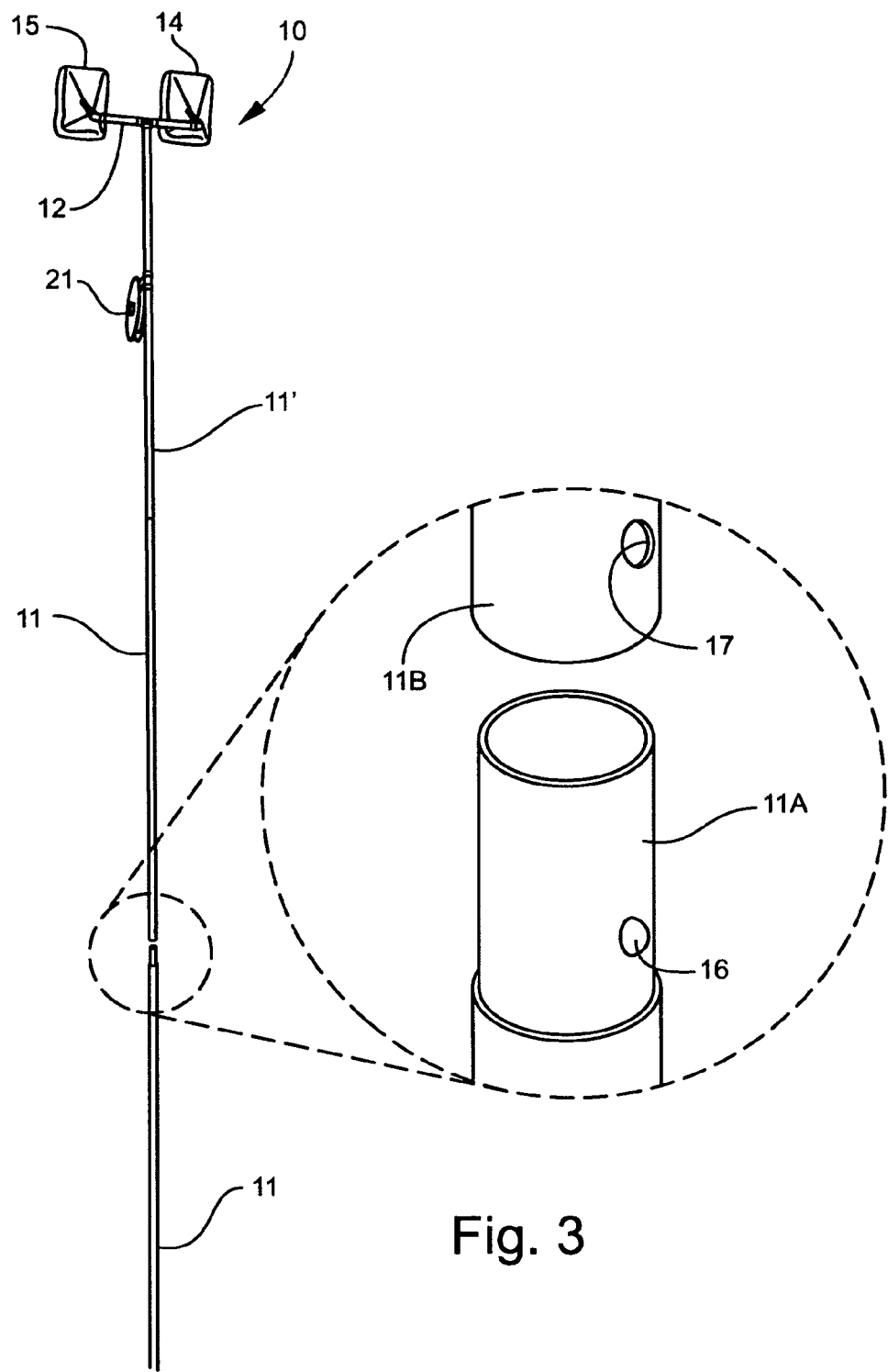
FIG. 3 is an enlarged fragmentary view illustrating means for assembling and releaseably locking adjacent elevating rods end-to-end.
Figure 4:
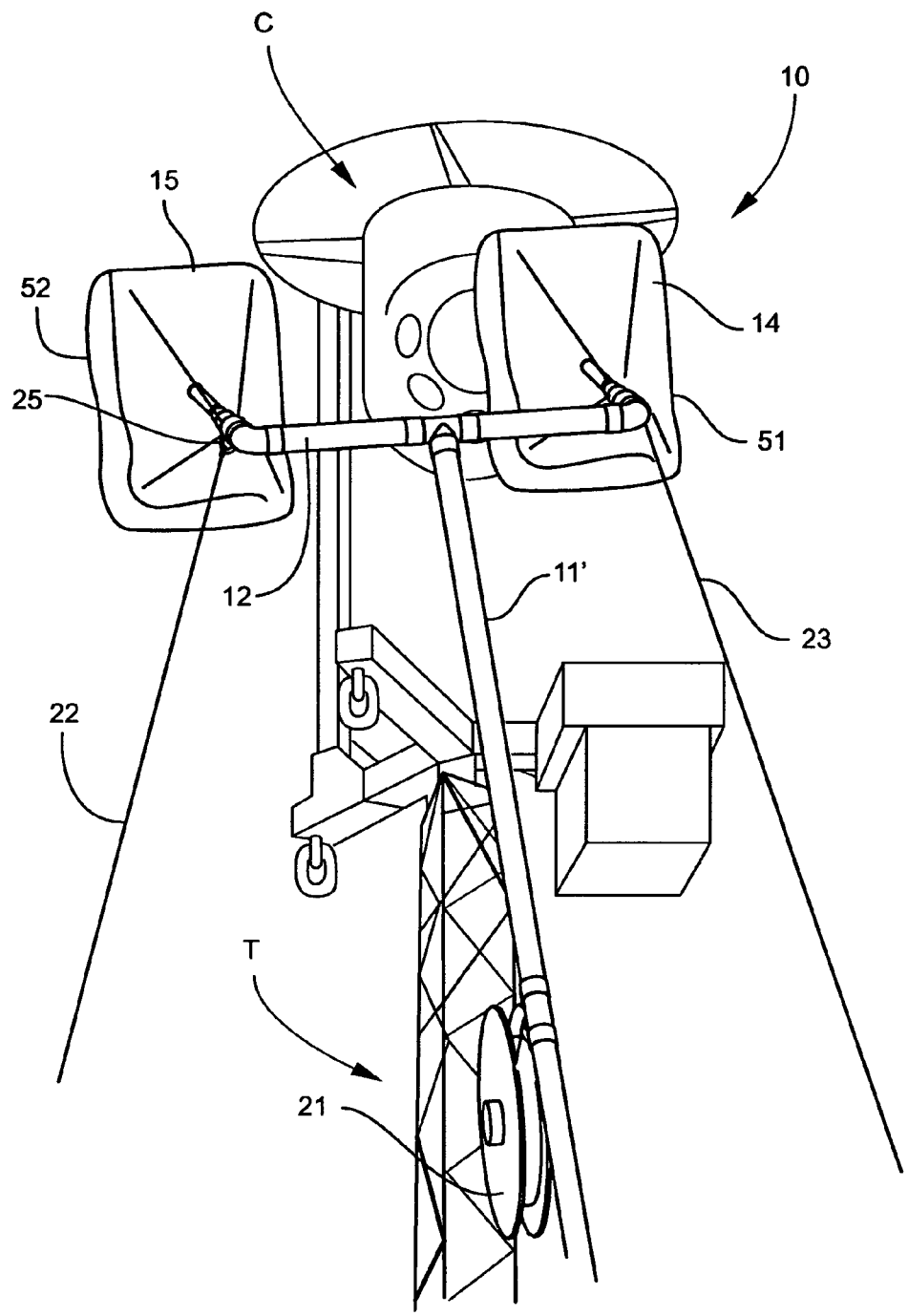
FIG. 4 is an enlarged view of the apparatus section designated at numeral 4 in FIG. 2.

Referring to FIGS. 2, 3, and 4, in exemplary embodiments described herein, the present disclosure comprises an apparatus 10 for cleaning the tower-mounted surveillance camera "C" in situ at its full operational altitude atop the RAID tower "T" (FIG. 2). The exemplary apparatus 10 may be transported and assembled in parts including elevating rods 11, a generally U-shaped adjustable head support assembly 12, and identical spaced cleaning heads 14, 15. The elevating rods 11 have opposing male and female ends 11A, 11B, shown in FIG. 3, designed to releasably lock together using respective spring-loaded detents 16 and locking holes 17. The elevating rods 11 may be 10-ft or more in length, and may be constructed of a lightweight metal, hard plastic, or other suitable rigid material. The leading (or distal end) elevating rod 11' may include a tower-traveling guide wheel 21 designed to engage the RAID tower "T" during end-to-end assembly of the elevating rods 11 to guide and support the rods vertically along the length of the tower "T". The elevating rods 11 are assembled end-to-end by a first serviceman "S1" until the spaced cleaning heads 14, 15 are properly located adjacent the elevated surveillance camera "C" at its operational altitude shown in FIG. 2. Stabilizing ropes 22, 23 may be attached to the head support assembly 12 at eyebolts 25 (See FIG. 5) and manned by second and third servicemen "S2" and "S3" to further support and stabilize the cleaning apparatus 10 during assembly and subsequent camera cleaning.

Figure 5:
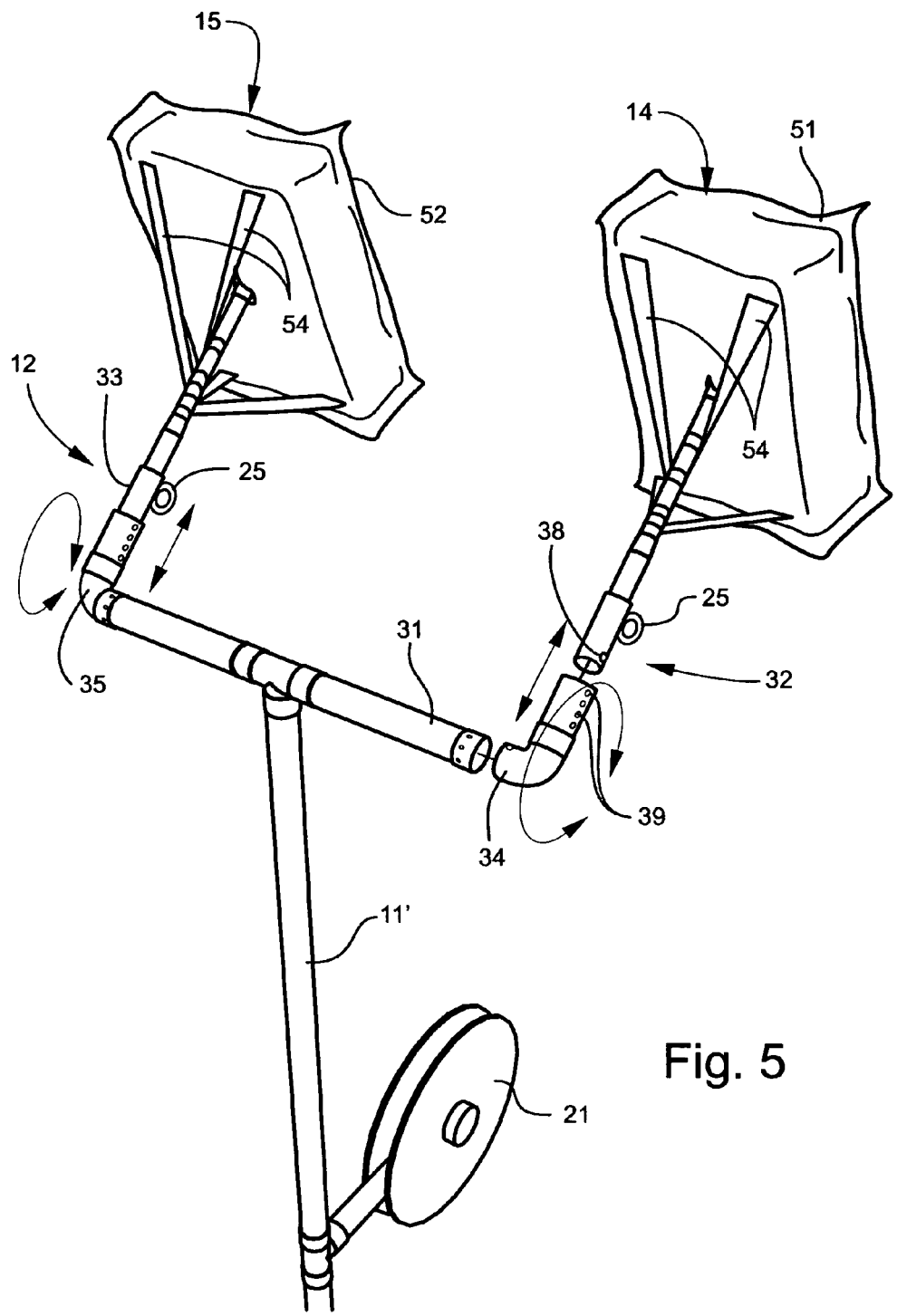
FIG. 5 is a fragmentary view of the cleaning apparatus with various parts of the head support assembly exploded away.
Figure 6:
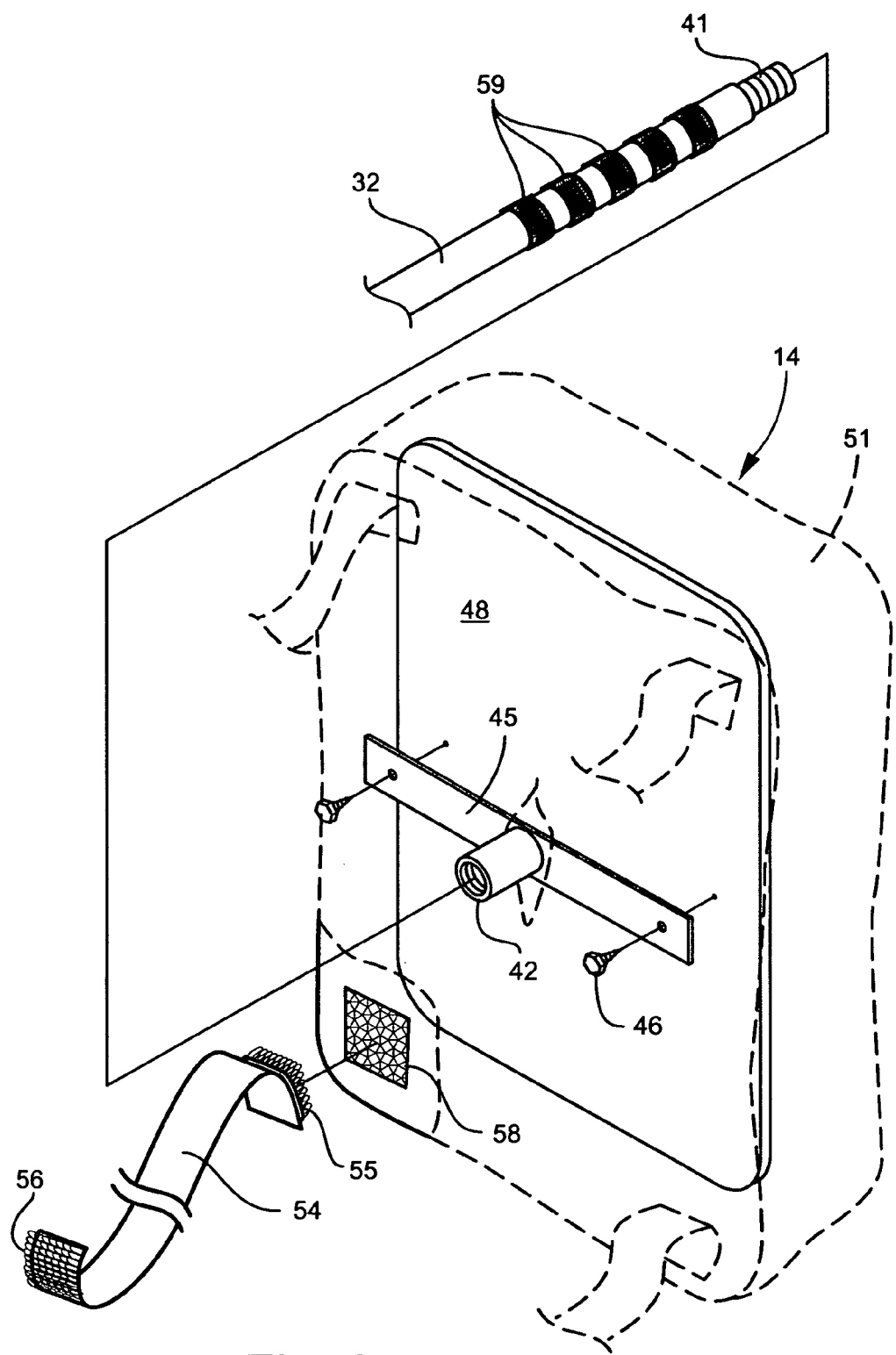
FIG. 6 illustrates various parts of the cleaning head and slip-on cleaning pad, and its removable attachment to the head support assembly.

As best shown in FIGS. 5 and 6, the head support assembly 12 is attached to a free end of the leading elevating rod 11', and comprises an elongated crossbar 31 and pair of adjustable arms 32, 33 extending from respective opposite ends of the crossbar 31. The adjustable arms 32, 33 attach to the crossbar 31 at respective 90-degree articulated joints 34, 35. Each joint 34, 35 is releasably locked into a desired fixed, forwardly-tilted position by a spring-loaded detent, and a selected one of a number of circumferentially-spaced locking holes. The adjustable arms 32, 33 interconnect the cleaning heads 14, and articulated joints 34, 35 of the crossbar 31. A base end of each arm 32, 33 is designed to insert into the articulated joint 34, 35, and to releasably lock at a selected desired length using a spring-loaded detent 38 and spaced locking holes 39. As shown in FIG. 6, the opposite end of the adjustable arm 32 has a screw thread 41 designed to mate with a complementary thread 42 formed with an attachment bar 45 secured by screws 46 (or the like) to a rigid support plate 48 of the cleaning head 14. Adjustable arm 33 and cleaning head 15 have identical attachment and support features (not shown).

The exemplary cleaning heads 14, 15 further comprise respective removable (e.g., slip-on) wet and dry cleaning pads 51, 52, shown best in FIGS. 4 and 5. Referring to FIG. 6, each cleaning pad 51, 52 is carried by its corresponding support plate (only plate 48 shown), and may be further secured to the adjustable arm 32, 33 by removable flexible straps 54 with hook and loop end fasteners 55, 56. The strap fasteners 55, 56 mate with complementary fasteners 58, 59 located on the cleaning pad 51, 52, and along a length of the adjustable arm 32, 33. A fabric (or disposable paper) face of the wet cleaning pad 51 may be impregnated with a cleaning solution prior to use, while the face of the dry cleaning pad 52 may comprise a soft terry-knit fabric or other such material suitable for cleaning the camera lens.

Referring again to FIGS. 2 and 4, when the cleaning apparatus 10 is deployed as previously described at least one of the cleaning heads 14, 15 is held stationary directly against the surveillance camera "C" and stabilized using ropes 22, 23, such that the selected wet or dry pad 51, 52 firmly contacts the camera lens. An operator then rotates the camera "C" and adjusts its position vertically and side-to-side allowing the stationary cleaning pad 51, 52 to fully clean the lens. The camera "C" may be cleaned first using the wet pad 51, and then dried using the soft-fabric dry pad 52. In the exemplary embodiment, the cleaning heads 14, 15 are approximately 12"×18" each, and may be spaced-apart approximately 18" to 24". The cleaning head support assembly 12 may be constructed of a lightweight plastic or other suitable substantially rigid material.

For the purposes of describing and defining the present invention it is noted that the use of relative terms, such as "substantially", "generally", "approximately", and the like, are utilized herein to represent an inherent degree of uncertainty that may be attributed to any quantitative comparison, value, measurement, or other representation. These terms are also utilized herein to represent the degree by which a quantitative representation may vary from a stated reference without resulting in a change in the basic function of the subject matter at issue.

Exemplary embodiments of the present invention are described above. No element, act, or instruction used in this description should be construed as important, necessary, critical, or essential to the invention unless explicitly described as such. Although only a few of the exemplary embodiments have been described in detail herein, those skilled in the art will readily appreciate that many modifications are possible in these exemplary embodiments without materially departing from the novel teachings and advantages of this invention. Accordingly, all such modifications are intended to be included within the scope of this invention as defined in the appended claims.

In the claims, any means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. Unless the exact language "means for" (performing a particular function or step) is recited in the claims, a construction under §112, 6th paragraph is not intended. Additionally, it is not intended that the scope of patent protection afforded the present invention be defined by reading into any claim a limitation found herein that does not explicitly appear in the claim itself.

What is claimed is:

1. An apparatus for cleaning an elevated tower-mounted surveillance camera in situ at an operational altitude on a camera tower, said apparatus comprising:
    a plurality of elongated elevating rods adapted for being assembled together end-to-end to extend from a ground elevation substantially to the tower-mounted camera;
    a head support assembly attached to one of said plurality of elevating rods, and adapted for being located proximate the tower-mounted camera;
    at least one cleaning head attached to said head support assembly, and adapted for engaging and cleaning a lens of the tower-mounted camera;
    a tower-traveling guide attached to one of said plurality of elevating rods, and adapted for engaging and moving along the camera tower as said elevating rods are assembled and extended from the ground elevation towards the tower-mounted camera.

2. The apparatus according to claim 1, and comprising at least one stabilizing rope attached to one of said plurality of elevating rods, and adapted for being held by a user at the ground elevation to stabilize said apparatus when deployed.

3. The apparatus according to claim 1, wherein said head support assembly comprises an articulated arm, and wherein said cleaning head is attached to said articulated arm.

4. The apparatus according to claim 1, wherein said head support assembly comprises an elongated crossbar, and first and second arms attached at respective ends of said crossbar.

5. The apparatus according to claim 4, and comprising first and second cleaning heads attached to respective first and second arms of said head support assembly.

6. The apparatus according to claim 5, and comprising first and second articulated joints interconnecting said crossbar and said first and second arms of said head support assembly.

7. The apparatus according to claim 1, wherein said cleaning head comprises a removable cleaning pad impregnated with a cleaning solution.

8. The apparatus according to claim 1, and comprising means for releasably locking together a male end of one elevating rod and a female end of an adjacent elevating rod.

9. The apparatus according to claim 1, wherein said tower-traveling guide comprises a rotatable wheel.

10. An apparatus for cleaning an elevated tower-mounted surveillance camera in situ at an operational altitude on a camera tower, said apparatus comprising:
    a plurality of elongated elevating rods adapted for being assembled together end-to-end to extend from a ground elevation substantially to the tower-mounted camera;
    a head support assembly attached to one of said plurality of elevating rods, and comprising an elongated crossbar, and first and second articulated arms attached at respective opposite ends of said crossbar and adapted for being located proximate the tower-mounted camera;
    first and second cleaning heads attached to respective first and second articulated arms of said head support assembly, and adapted for engaging and cleaning a lens of the tower-mounted camera;

a tower-traveling guide attached to one of said plurality of elevating rods, and adapted for engaging and moving along the camera tower as said elevating rods are assembled and extended from the ground elevation towards the tower-mounted camera.

11. The apparatus according to claim 10, and comprising at least one stabilizing rope attached to one of said plurality of elevating rods, and adapted for being held by a user at the ground elevation to stabilize said apparatus when deployed.

12. The apparatus according to claim 10, wherein said first cleaning head comprises a removable cleaning pad impregnated with a cleaning solution.

13. The apparatus according to claim 12, wherein said second cleaning head comprises a removable substantially dry cleaning pad.

14. The apparatus according to claim 10, and comprising means for releasably locking together a male end of one elevating rod and a female end of an adjacent elevating rod.

15. The apparatus according to claim 10, wherein said tower-traveling guide comprises a rotatable wheel.

\* \* \* \* \*